United States Patent [19]

Gordon et al.

[11] 4,020,134
[45] Apr. 26, 1977

[54] METHOD FOR PREPARING SHAPED, GREEN CERAMIC COMPACTS

[75] Inventors: Ronald S. Gordon, Salt Lake City; Ralph W. Sutton, Tooele, both of Utah; Gerald J. Tennenhouse, Oak Park, Mich.

[73] Assignee: Ford Motor Company, Dearborn, Mich.

[22] Filed: Jan. 29, 1975

[21] Appl. No.: 545,046

[52] U.S. Cl. .................................. 264/63; 106/63; 264/61; 264/176 R; 264/DIG. 25
[51] Int. Cl.² ................................ C04B 35/64
[58] Field of Search ......... 264/63, 56, 61, DIG. 25, 264/176 R; 106/63

[56] References Cited

UNITED STATES PATENTS

| | | | |
|---|---|---|---|
| 2,952,877 | 9/1966 | Park | 264/63 |
| 3,285,873 | 11/1966 | Bailey | 264/63 |
| 3,417,054 | 12/1968 | Merijan et al. | 260/66 |
| 3,652,749 | 3/1972 | Sobel et al. | 264/63 |

OTHER PUBLICATIONS

Bruch, "Extruding Fine Alumina Powders," *Ceramic Age*, June (1972), pp. 18–25.

*Primary Examiner*—Robert F. White
*Assistant Examiner*—John Parrish
*Attorney, Agent, or Firm*—Roger L. May; Keith L. Zerschling

[57] ABSTRACT

A method for preparing shaped, green ceramic compacts suitable for firing to form high density $\beta''$-alumina containing ceramic bodies comprising: (1) mixing between about 2.5 parts by weight and about 4.5 parts by weight of a ceramic composition comprising at least about 80 weight percent of aluminum oxide and from about 5 to about 15 weight percent of sodium oxide with 1 part by weight of a binder composition consisting essentially of between about 20 weight percent and about 35 weight percent of polyvinyl pyrrolidone having a number average molecular weight ($M_n$) between about 20,000 and about 160,000 and between about 80 weight percent and about 65 weight percent of ethylene glycol; (2) extruding the mixture so formed through a die of desired configuration; and (3) heating the extrudate at temperatures and for periods of time necessary to evaporate the ethylene glycol solvent and burn off the polyvinyl pyrrolidone.

19 Claims, 1 Drawing Figure

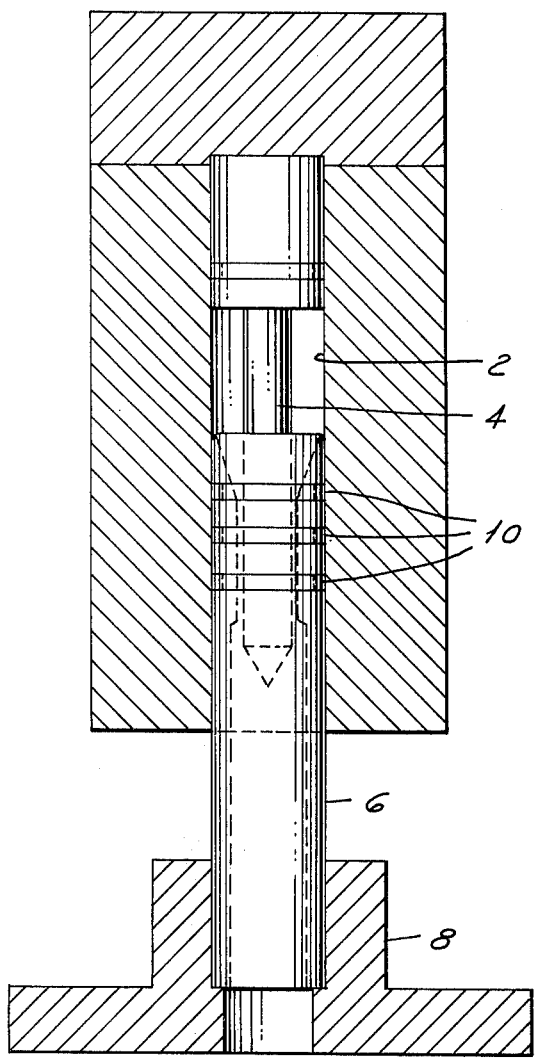
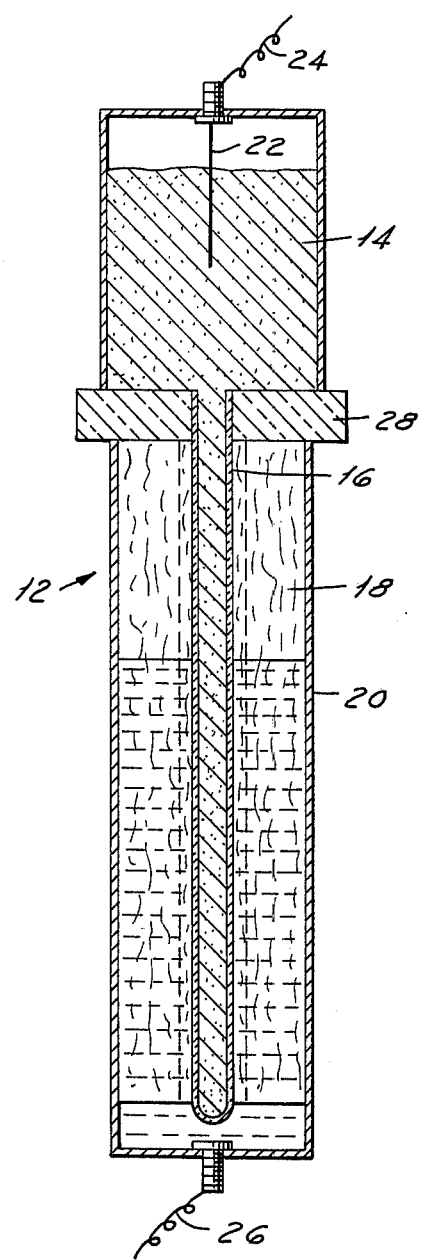

METHOD FOR PREPARING SHAPED, GREEN CERAMIC COMPACTS

The invention herein described was made in the course of or under a Contract or subcontract thereunder with the National Science Foundation.

This application relates to a method for preparing shaped, green ceramic compacts suitable for firing to form high density $\beta''$-alumina containing ceramic bodies. More particularly, this application relates to a method for preparing shaped, green ceramic compacts which may be fired to form high density $\beta''$-alumina containing ceramic bodies suitable for use in a variety of electrical conversion devices. Still more particularly, this application relates to a method for extruding a composition which may be fired by conventional sintering techniques to form shaped, polycrystalline $\beta''$-alumina containing bodies which are ideally suited for use as reaction zone separators or solid electrolytes in certain electrical conversion devices.

Among the polycrystalline bi- or multi-metal oxides which are most suitable for use in electrical conversion devices, particularly those employing molten metal and/or molten metal salts as reactants, are those in the family of Beta-aluminas, all of which exhibit a generic crystalline structure which is readily indentifiable by X-ray diffraction. Thus, Beta-type-alumina or sodium-Beta-type-alumina is a material which may be thought of as a series of layers of aluminium oxide ($Al_2O_3$) held apart by layers of linear Al—O bond chains with sodium ions occupying sites between the aforementioned layers and columns. Numerous Beta-type-alumina polycrystalline materials exhibiting this generic crystalline structure are disclosed in the following U.S. patents, the disclosures of which are incorporated herein by reference: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531; and 3,811,943.

Among the numerous polycrystalline Beta-type-alumina materials disclosed in those patents and which may be processed in accordance with the method of this invention are the following:

1. Standard Beta-type aluminas which exhibit the above-discussed crystlalline structure comprising a series of layers of aluminum oxide held apart by layers of linear Al—O bond chains with sodium ions occupying sites between the aforementioned layers and columns. As discussed in the aforementioned patents, Beta-type-alumina is formed from compositions comprising at least about 80 percent by weight, preferably at least about 85 percent by weight of aluminum oxide and between about 5 and about 15 percent by weight, preferably between about 8 and about 11 percent by weight sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. $\beta$-alumina is one crystalline form which may be represented by the formula $Na_2O.11Al_2O_3$. The second crystalline form is $\beta''$-alumina which may be represented by the formula $Na_2O.6Al_2O_3$. It will be noted that the 62 " crystalline form of Beta-type-alumina contains approximately twice as much soda (sodium oxide) per unit weight of material as does the $\beta$-alumina. It is the $\beta''$-alumina crystalline structure which is preferred for the formation of solid electrolytes or reaction zone separators for electrical conversion devices. In fact, if the less desirable $\beta$ form is present in appreciable quantities in the final ceramic, certain electrical properties of the body will be impared. Various techniques have been developed for preparing the ceramic compositions and sintering the same to promote the formation of the $\beta''$ crystalline form as opposed to the $\beta$-crystalline form.

2. Boron oxide $B_2O_3$ modified Beta-type-alumina wherein about 0.1 to about 1 weight percent of boron oxide is added to the composition. This modification of the Beta-type-alumina is more throughly discussed in aforementioned U.S. Pat. No. 3,404,036.

3. Substituted Beta-type-alumina wherein the sodium ions of the composition are replaced in part or in whole with other positive ions which are preferably alkaline metal ions.

4. Beta-type-alumina which is modified by the addition of a minor proportion by weight of a metal ion having a valence not greater than 2 such that the modified Beta-type-alumina composition comprises a major proportion by weight of ions of aluminum and oxygen and a minor proportion by weight of metal ions in crystal lattice combination along with cations which migrate in relation to the crystal lattice as a result of an electric field, the preferred embodiment being wherein the metal ion having a valance not greater than 2 is either lithium or magnesium or a combination of lithium and magnesium. These metals may be included in the composition in the form of lithium oxide or magnesium oxide or mixtures thereof in amounts ranging from about 0.1 to about 5 weight percent, preferably from about 0.1 to about 1.5 weight percent. This type of modified Beta-type-aluminum is more thoroughly discussed in U.S. Pat. Nos. 3,475,225 and 3,535,163 mentioned above. Such lithia and magnesia stabilized $\beta$-aluminas are preferred compositions for the preparation of Beta-type-alumina bodies demonstrating the $\beta''$ crystal structure. The Beta-type-aluminas preferred for processing in accordance with this invention include lithium oxide as the modifier.

The energy conversion devices for which the bodies prepared from compacts made in accordance with this invention are particularly useful as solid electrolytes are disclosed in some detail in the aforementioned patents. In the operation of such energy conversion devices, the cations, such as sodium in the $\beta''$-alumina, or some other cation which has been substituted for sodium in part or in whole, migrate in relation to the crystal lattice as a result of effects caused by an electric field. Thus, the solid ceramic electrolytes which may be prepared from the dense, green ceramic compacts made by the method of this invention are particularly suited to provide selective cationic communication between the anodic and cathodic reaction zones of the energy conversion devices and are essentially impermeable to the fluid reactants employed in the device when the reactants are in the elemental, compound or anionic states. Among the energy conversion devices in which $\beta''$-alumina containing ceramics are useful are: (1) primary batteries employing electrochemically reactive oxidant and reductants in contact and on opposite sides of the solid electrolyte or reaction zone separators; (2) secondary batteries employing, electrochemically reversably reactive oxidants and reductants in contact with and on opposite sides of the solid electrolyte or reaction zone separator; (3) thermo-electric generators wherein a temperature and pressure differential is maintained between anodic and cathodic reaction zones and/or between anode and cathode and a molten alkaline metal which is converted to ionic form, passed through the polycrystalline $\beta''$-alumina containing ceramic wall or inorganic membrane and reconverted to elemental form; and (4) thermally regenerated fuel cells.

Prior art techniques for the preparation of shaped, dense greencceramic bodies suitable for forming $\beta''$-containing cermaic bodies have typically involved pouring a composition comprising at least about 80° weight percent of aluminum oxide and between about 5 and about 15 weight percent of sodium oxide into a suitably shaped mold and then isostatically pressing at high pressure (typically around 60,000 psi). This process, while entirely suitable for forming high quality compacts, is time consuming and not readily adaptable to large scale commercial production of compacts. In order to make the aforementioned electrical energy conversion devices cost competitive with other electrical conversion devices it is, among other things, necessary to devise a rapid and efficient method for the production of such compacts.

Prior art techniques for extruding shaped, dense, green ceramic bodies suitable for sintering to form $\beta''$-alumina bodies have not been successful. The method of this invention obviates deficiencies of prior art techniques, making it possible to extrude the composition at reasonable rates.

BRIEF DESCRIPTION OF THE INVENTION

The method of this invention basically involves mixing a composition which may be fired by known techniques to form $\beta'$-containing ceramic bodies with a particular binder, extruding the composition through a suitable shaped die and heating the extrudate at a temperature required to burn off the binder, but not high enough to begin sintering the composition.

The various embodiments of the method of this invention will be more fully understood from the detailed description of the invention which follows when taken in combination with the drawings in which:

FIG. 1 is a schematic drawing of an extrusion apparatus suitable for carrying out the method of the invention; and FIG. 2 is a schematic drawing of an electrical conversion device employing the ceramic which may be prepared from the shaped, dense green ceramic compacts prepared by the method of this invention.

DETAILED DESCRIPTION OF THE INVENTION

More specifically, the invention sought to be claimed in this application is a method for preparing shaped, green ceramic compacts suitable for firing to form high density $\beta''$-alumina containing ceramic bodies comprising: (1) mixing between about 2.5 parts by weight and about 4.5 parts by weight, preferably between about 2.8 parts by weight and about 3.8 parts by weight, of a ceramic composition comprising at least about 80 weight percent, preferably at least about 85 weight percent, of aluminum oxide, from about 5 to about 15 weight percent, preferably from about 8 to about 11 weight percent, of sodium oxide and preferably between about 0.1 and about 5 weight percent of lithium oxide or magnesium oxide with 1 part by weight of a binder composition consisting essentially of between about 20 weight percent and about 35 weight percent, preferably 25 weight percent, of polyvinyl pyrrolidone having a number average molecular weight ($M_n$) of between about 20,000 and about 160,000, preferably between about 30,000 and about 500,000 and most preferably about 40,000 and between about 80 weight percent and about 65 weight percent, preferably 75 weight percent, of ethylene glycol; (2) extruding the mixture so formed through a die of the desired configuration under a pressure of between about 3,000 and about 50,000 psi, preferably between about 8,000 and about 40,000 psi, at a rate of between about 0.25 inches and about 50 inches per minute; and (3) heating the extrudate at temperatures and for periods of time necessary to evaporate the solvent and burn off the polyvinyl pyrrolidone. The solvent may generally be evaporated at a temperature of between about 75° and about 180° C, preferably about 120° C. The time required for evaporation of solvent will vary, of course, but generally by heating for between about one (1) and about twenty (20) hours will suffice. The polyvinyl pyrrolidone may be burned off at a temperature of between about 250° and about 400° C by heating for between about 0.25 and about 4 hours. However, it may be desired to heat at a higher temperature, e.g., around 1,000° C for a longer period of time to guarantee that all residual carbon is removed and to slightly sinter the body to give it integrity. One of ordinary skill in this art will, of course, select the appropriate temperatures and times for evaporating solvents and burning off the polyvinyl pyrrolidone without undue experimentation. The shaped, green ceramic compacts produced in accordance with the process of this method will generally have a green density of between about 45 percent and about 60 percent, preferably greater than 50 percent, of the theoretical density for polycrystalline $\beta''$-alumina ceramic.

FIG. 1 is a diagrammatic view of a suitable extrusion apparatus for preparing dense, green ceramic compacts in accordance with the process of the invention. The apparatus comprises chamber 2 in which the ceramic composition to be processed may be disposed either in powder form or as a low density billet. A fixed mandrel 4 is disposed centrally of chamber 2. In operation, die 6 which is resting in movable base 8 is moved upward through chamber 2 by moving base 8, for example by hydraulic means, the ceramic composition being forced between mandrel 4 and the inner wall of die 6 to form a tube. O-rings 10 around die 6 prevent back extrusion. It will be recognized by those skilled in the art that any conventional extrusion apparatus may be employed and, of course, the design of the apparatus will vary with the desired final shape.

FIG. 2 shows an energy conversion device in which shaped, green ceramic bodies which have been made in accordance with this invention and which have been sintered in accordance with known procedures may be employed. In FIG. 2 there is shown a cell generally indicated as 12 which may be one unit of the plurality of cells in series and/or parallel forming a battery. In the embodiment shown an anodic reactant 14, e.g., molten sodium, is shown within tube 16 which is prepared by sintering a shaped, green ceramic compact prepared in accordance with the process of this invention. In contact with the exterior of tube 16 is a porous conductor 18 immersed in a sulfur-comprising cathodic reactant-electrolyte. Encasing both 16 and 18 is a metal case, cathode 20. In contact with the molten sodium 14, is a conductor 22, e.g., platinum wire, which serves as the negative lead to an external circuit, not shown, which includes a resistance, e.g., a lightbulb, D. C. motor, etc., and is an electrical connection via wire 24 with a positive lead, conductor 26. Lead 26 is in electrical contact with cathode 20. The cell may be operated under a blanket or inert gas or suitably sealed by a cover 28. The sodium atoms of the anode reactant 14 yield electrons to conductor 22 and the ions pass through tube 16 to the cathodic reactant. Sulfur atoms within 18 accept electrons from the external circuit via cathode 20 and porous conductor 18. In the particular embodiment shown, porous conductor 18 is shown as a fibrous sheet material fabricated from graphite or carbon fibers.

While the embodment shown in FIG. 2 employs a $\beta''$-alumina containing ceramic tube which may be prepared by sintering the tubes extruded using the apparatus of FIG. 1, it will be appreciated by reading the aforementioned incorporated patents that the reaction zone separator may be of varying shapes and sizes.

The following specific examples will more fully illustrate the details of the method of this invention.

EXAMPLE I

A ceramic composition is prepared in accordance with the following procedures. Sodium carbonate and lithium nitrate of reagent grade are dried at 280° and 120° C, respectively and cooled and stored in desiccators. Linde "C" alumina, the other component of the ceramic composition is used as received and stored in plastic bags. To produce 100 parts by weight of a first final reactive ceramic product 14.88 grams of sodium carbonate ($Na_2CO_3$) 3.68 grams of lithium nitrate ($LiNO_3$) and 90.6 grams of aluminum oxide ($Al_2O_3$) are weighed in air and dry mixed on a paint shaker in polyethylene bottles containing Lucalox balls. The reacted ceramic mixture which will be obtained from these reactants will comprise 8.7 weight percent sodium oxide ($Na_2O$), 0.8 weight percent lithium oxide ($Li_2O$) and 90.60 weight percent aluminum oxide.

The mixture of reactants is next rolled out on aluminum foil and the balls removed. The composition is then placed in a covered platinum container, reacted at 1250° C to 2 hours and cooled in air. The reacted powder is again rolled to remove lumps, reloaded into mixing container along with Lucalox balls and run again on the paint shaker. After this last mixing operation, the composition is again rolled to remove all of the Lucalox balls.

Three Hundred Sixty grams of a ceramic composition prepared as above is mixed with 100 parts of a binder composition containing 25 weight percent polyvinyl pyrrolidone having a number average molecular weight ($M_n$) of about 40,000 and 75 weight percent of ethylene glycol. This composition is extruded using a die diameter of 0.272 inches and an extrusion loading rate of 0.2 inches per minute. The extrudate obtained in rod form is next heated to 120° C for approximately 17 hours to evaporate most of the ethylene glycol and then fired at 1000° C to burn off the polyvinyl pyrrolidone and slightly sinter the body to give it greater green strength. This rod shaped, green ceramic body is then sintered in accordance with conventional techniques (e.g., 1585° to 1610° C). The resultant $\beta''$-alumina containing ceramic exhibits a density of 3.13 g/cc which is 95.9 percent of theoretical for $\beta''$-alumina. The sintered rod exhibits a resistivity at 300° C of 3.1 ohm-cm. The force employed in extruding the powder in this example was 40,000 lbs.

EXAMPLE II

Three Hundred Ninety grams of the ceramic composition prepared in accordance with the procedure of Example I is mixed with 100 grams of the binder composition prepared as in Example I. This mixture is extruded using a die of 0.272 inches in diameter, an extrusion loading rate of 0.2 inches per minute and a force of extrusion of 39,000 lbs. The extruded rod so formed is heated as in Example I to evaporate the ethylene glycol and burn off the polyvinyl pyrrolidone. The resultant product has a green density of 54.7 percent of the theoretical density for $\beta''$-alumina. The green body is sintered in accordance with prior art techniques to yield a body having an absolute density of 3.17 g/cc which is 97.2 of the theoretical density for $\beta''$-alumina. The body exhibits a resistivity at 300° C of 2.7 ohm-cm and a fracture strength of 14.500 psi.

EXAMPLE III

Three Hundred Sixty grams of the ceramic composition prepared in accordance with Example I is mixed with 100 grams of the binder composition prepared in accordance with Example I. Rods are formed from this mixture by extruding using a die diameter of 0.272, an extrusion loading rate of 0.2 inches per minute and a force of extrusion of 25,000 lbs. The resultant extrudate is heated in accordance with the procedure of Example I to evaporate the solvent and burn off the polyvinyl pyrrolidone. The green density of the body is 56.9 percent of theoretical for $\beta''$-alumina. The density of the body after conventional sintering is 3.15 g/cc which is 96.6 percent of theoretical $\beta''$-alumina. The resistivity of the ceramic rod at 300° C is 3.0 ohm-cm and the fracture strength is 15,000 psi.

EXAMPLE IV

Three Hundred fifty five grams of the ceramic composition prepared in accordance with the procedure of Example I is mixed with 100 grams of the binder composition prepared in accordance with the procedure of Example I. The resultant mixture is formed into rods by extruding through a die having a diameter of 0.272 inches at an extrusion loading rate of 0.2 inches per minute and a force of extrusion of 39,000 lbs. The extruded rod is heated in accordance with the procedure of Example I to drive off the solvent and polyvinyl pyrrolidone leaving a body with a green density of 57.4 percent of theoretical for $\beta''$-alumina. The density of the body after sintering by conventional techniques is 3.19 g/cc which is 97.7 percent of the theoretical for $\beta''$-alumina. The body exhibits a resistivity at 300° C of 3.4 ohm-cm.

EXAMPLE V

To 360 grams of the ceramic powder prepared in accordance with the procedure of Example I is added 100 grams of the binder composition prepared in accordance with Example I. This mixture is formed into tubes by extruding with the apparatus of Example I having a die with an outer diameter of 0.5 inches and an inner diameter of 0.42 inches. The extrusion loading rate employed is 0.2 inches per minute giving a tube extrusion rate of 2.7 inches per minute. The resultant tube is heated in accordance with the procedure of Example I to drive off the solvent and the polyvinyl pyrrolidone. The green body exhibits a density of 57.2 percent of theoretical for β''-alumina in the green state and a density of 3.10 g/cc which is 95.1 percent of theoretical for β''-alumina in the sintered state. The resultant tube exhibits resistivity at 300° C of 5.5 ohm-cm.

EXAMPLE VI

Three Hundred forty five grams of the ceramic composition prepared in accordance with Example I is mixed with 100 grams of the binder composition prepared in accordance with Example I. The resultant mixture is formed into tubes by extruding using the apparatus shown in FIG. 1 with a die having an outer diameter of 0.5 inches and an inner diameter of 0.42 inches and employing an extrusion loading rate of 0.2 inches per minute. The resultant tube is heated in accordance with the procedure of Example I to drive off the binder components and exhibits a density of 58.9 percent of theoretical for β''-alumina. The sintered density of the tube is 97.8 percent of theoretical for β''-alumina or 3.19 g/cc. The resistivity of the final sintered body at 300° C is 2.8 ohm-cm and the fracture strength 15,800.

EXAMPLE VII

A ceramic composition is prepared in the same manner as set forth in Example I with the exception that instead of Linde "C" alpha-alumina Alcoa c-33 alpha-alumina which has been calcined at 1200° C prior to adding the sodium carbonate and lithium nitrate is employed. 290 grams of this composition is mixed with 100 grams of the binder composition set forth in Example I and the resultant mixture extruded to form rods. The die employed has a diameter of 0.272 and the force of extrusion is 11,000 lbs. The resultant rod is heated to 400° C over a 6 hour period and then rapidly heated (less than 1 hour) to 1,000° C to drive off the binder composition and give a green density of 53.8 percent of theoretical for β''-alumina. The rod is then sintered at a temperature of 1585° C for 40 minutes to give a body having a sintered density of 3.09 g/cc which is 94.9 percent of theoretical for β''-alumina. The resultant body has a resistivity of 300° C of 2.9 ohm-cm.

EXAMPLE VIII

Three Hundred twenty grams of a ceramic composition prepared as in Example VII is combined with 100 grams of the binder composition of Example I and the mixture extruded to form a rod. The diameter of the die employed is 0.272 inches and the force of extrusion is 20,000 lbs. The resultant rod is heated as in Example VII to drive off the binder composition leaving a body with a green density of 57.2 percent of theoretical for β''-alumina. This green body is then sintered at 1600° C for 40 minutes to give a body having a density of 3.10 g/cc which is 95.2 percent of theoretical for β''-alumina. The resistivity of the body is 4.0 ohm-cm at 300° C.

EXAMPLE IX

Three Hundred Twenty grams of the ceramic composition prepared in Example VII is combined with 100 grams of the binder composition of Example I and extruded to form a rod. The die employed has a diameter of 0.272 inches and the force of extrusion is 20,000 lbs. The resultant tube is heated as in Example VII to drive off the binder composition and yield a green density of 57.2 percent of theoretical for β''-alumina. The rod is then sintered at 1595° C for 30 minutes to yield a density of 3.16 g/cc which is 97.0 percent of theoretical for β''-alumina. The resistivity of the body at 300° C is 3.9 ohm-cm.

EXAMPLE X

Three Hundred twenty five grams of the composition prepared in accordance with Example VII is combined with 100 grams of the binder composition of Example I and extruded to form a rod. The die diameter employed is 0.272 inches and the force of extrusion 8400 lbs. The extrudate is heated as in Example VII to drive off the binder composition and yield a green density of 54.1 percent of theoretical for β''-alumina. This green body is sintered at 1585° C for about 20 minutes to yield a sintered density of 3.15 g/cc which is 96.5 percent of theoretical for β''-alumina. The resistivity of the body is 6.0 ohm-cm at 300° C.

EXAMPLE XI

Three hundred thirty five grams of the composition prepared in accordance with Example VII is combined with 100 grams of the binder composition of Example VII and the mixture is extruded to form a rod. The die diameter employed is 0.272 and the extrusion force is 10,000 lbs. The extrudate is heated in accordance with the procedure of Example VII to drive off the binder composition and yield a green density of 56.8 percent of theoretical for β''-alumina. The green body is then sintered at 1600° C for about 40 minutes to yield a sintered density of 3.1 g/cc which is 95.7 percent of theoretical β''-alumina. The body has a resiativity of 3.8 ohm-cm.

EXAMPLE XII

Three Hundred thirty five grams of the composition prepared in accordance with Example VII is mixed with 100 grams of the binder composition of Example I and extruded to form a rod. The die diameter employed is 0.272 and the extrusion force is 10,000 lbs. The extrudate is heated in accordance with the procedure of Example VII to drive off the binder composition and yield a green density of 56.8 percent of theoretical for β''-alumina. This green body is then sintered at 1595° C for 30 minutes to yield a sintered density of 3.14 gram/cc which is 96.3 percent of theoretical for β''-alumina. The resistivity of this sintered body is 3.9 ohm-cm at 300° C.

We claim:
1. A method for preparing shaped, green ceramic compacts suitable for firing to form high density β''-alumina containing ceramic bodies comprising:
   1. mixing between about 2.5 parts by weight and about 4.5 parts by weight of a ceramic composition comprising at least about 80 weight percent of aluminum oxide and from about 5 to about 15 weight percent of sodium oxide with 1 part by weight of a binder composition consisting essentially of between about 20 weight percent and about 35 weight percent of polyvinyl pyrrolidone having a number average molecular weight between about 20,000 and about 160,000 and between about 80 weight percent and about 65 weight percent of ethylene glycol;
   2. extruding the mixture so formed through a die of the desired configuration; and

3. heating the extrudate at a temperature and for a time so as to evaporate the ethylene glycol solvent therefrom and to burn off the polyvinyl pyrrolidone.

2. A method in accordance with claim 1, wherein said polyvinyl pyrrolidone has a number average molecular weight between about 30,000 and about 50,000.

3. A method in accordance with claim 1, wherein said polyvinyl pyrrolidone has a number average molecular weight of about 40,000.

4. A method in accordance with claim 1, wherein the mixture of said ceramic composition and said binder composition is extruded through said die at a pressure of between about 3000 psi and about 50,000 psi at a rate of between about 0.25 inches/min. and about 50 in./min.

5. A method in accordance with claim 4, wherein said mixture is extruded at a pressure of between about 8000 psi and about 40,000 psi.

6. A method in accordance with claim 1, wherein the density of said shaped, green ceramic compact is between about 45 and about 60 weight percent of the theoretical density for $\beta''$-alumina.

7. A method in accordance with claim 1, wherein between about 2.8 parts by weight and about 3.8 parts by weight of said composition is mixed with 1 parts by weight of a binder composition consisting esssentially of a solution of about 75 weight percent ethylene glycol and about 25 weight percent of polyvinyl pyrrolidone having a molecular weight of about 40,000 and wherein the extrudate formed has a green density greater than 50 percent of the theoretical density for $\beta''$-alumina.

8. A method in accordance with claim 1, wherein said ethylene glycol solvent is evaporated by heating to a temperature of between about 75° and about 180° C and said polyvinyl pyrrolidone is subsequently burned off by heating to a temperature between about 250° and about 400° C.

9. A method in accordance with claim 1, wherein said composition includes from about 0.1 to about 1 weight percent of boron oxide.

10. A method in accordance with claim 1, wherein said composition includes from about 0.1 to about 1.5 weight percent of lithium oxide, magnesium oxide or a mixture thereof.

11. A method in accordance with claim 10, wherein said composition contains between about 0.1 and about 1.5 weight percent of lithium oxide.

12. A method in accordance with claim 1, wherein said die is shaped such that the extrudate has a rod form.

13. A method in accordance with claim 1, wherein said die is shaped such that the extrudate has a tubular form.

14. A method for preparing shaped, green ceramic compacts suitable for firing to form high density $\beta''$-alumina containing ceramic bodies having a density of between about 45 and about 60 percent of the theoretical density for $\beta''$-alumina comprising:
1. mixing between about 2.5 parts by weight and about 4.5 parts by weight of a ceramic composition comprising at least about 80 weight percent of aluminum oxide, between about 5 and about 15 weight percent of sodium oxide and between about 0.1 and 5 weight percent of lithium oxide, magnesium oxide or a mixture thereof with 1 part by weight of a binder composition consisting essentially of between about 20 weight percent and about 35 weight percent of polyvinyl pyrrolidone having a molecular weight of between about 30,000 and about 50,000 and between about 80 weight percent and about 65 weight percent of ethylene glycol;
2. extruding the mixture so formed through a die of the desired configuration at a pressure of between about 3000 psi and about 50,000 psi at a rate of between about 0.25 inch/min. and for about 50 inch/min.

15. A method in accordance to claim 14, wherein said mixture is extruded at a pressure of between about 8000 psi and about 40,000 psi.

16. A method in accordance with claim 14, wherein between about 2.8 parts by weight and about 3.8 parts by weight of said composition is mixed with a binder composition consisting essentially of about 25 weight percent of polyvinyl pyrrolidone having a molecular weight of about 40,000 and about 75 weight percent of ethylene glycol and wherein said extrudate has a density greater than about 50 percent of the theoretical density for $\beta''$-alumina.

17. A method in accordance with claim 14, wherein said composition contains between about 0.1 weight percent and about 1.5 weight percent of lithium oxide.

18. A method in accordance with claim 14, wherein said die is shaped such that the extrudate is in a rod form.

19. A method in accordance with claim 14, wherein said die is shaped such that the extrudate is in a tubular form.

* * * * *

UNITED STATES PATENT AND TRADEMARK OFFICE
CERTIFICATE OF CORRECTION

PATENT NO. : 4,020,134
DATED : April 26, 1977
INVENTOR(S) : Ronald S. Gordon et al It is certified that error appears in the above-identified patent and that said Letters Patent are hereby corrected as shown below:

On the cover sheet, item [73] should read as shown:

--Assignees: Ford Motor Company, Dearborn, Michigan; University of Utah, Salt Lake City, Utah--

Signed and Sealed this

Thirtieth Day of March 1982

(SEAL)

Attest:

Attesting Officer

GERALD J. MOSSINGHOFF

Commissioner of Patents and Trademarks